US011437677B2

(12) United States Patent
Rangwala

(10) Patent No.: US 11,437,677 B2
(45) Date of Patent: Sep. 6, 2022

(54) UNIVERSAL BATTERY TRAY

(71) Applicant: Toshiba International Corporation, Houston, TX (US)

(72) Inventor: Zaheer Iqbal Rangwala, Katy, TX (US)

(73) Assignee: Toshiba International Corporation, Houston, TX (US)

( * ) Notice: Subject to any disclaimer, the term of this patent is extended or adjusted under 35 U.S.C. 154(b) by 358 days.

(21) Appl. No.: 16/655,979

(22) Filed: Oct. 17, 2019

(65) Prior Publication Data

US 2021/0119191 A1 Apr. 22, 2021

(51) Int. Cl.
*H01M 50/20* (2021.01)
*H01M 50/207* (2021.01)
*H01M 50/204* (2021.01)
*H02J 9/00* (2006.01)

(52) U.S. Cl.
CPC ......... *H01M 50/20* (2021.01); *H01M 50/204* (2021.01); *H01M 50/207* (2021.01); *H02J 9/00* (2013.01)

(58) Field of Classification Search
CPC .. H01M 50/20; H01M 50/202; H01M 50/204; H01M 50/207; H01M 50/233
See application file for complete search history.

(56) References Cited

U.S. PATENT DOCUMENTS

| 10,096,807 | B2 * | 10/2018 | Fister | H01M 10/6554 |
| 2005/0058891 | A1 * | 3/2005 | Marraffa | H01M 50/20 |
| | | | | 429/99 |
| 2019/0115570 | A1 * | 4/2019 | McCollum | B65D 21/0212 |

FOREIGN PATENT DOCUMENTS

JP 2012123917 A * 6/2012

* cited by examiner

*Primary Examiner* — Jonathan G Jelsma
(74) *Attorney, Agent, or Firm* — Baker Botts L.L.P.

(57) ABSTRACT

The present disclosure relates to battery cabinets and other power or electronic apparatuses comprising batteries, more particularly, to a tray configured to expand to accommodate different orientations of one or more batteries. A tray configured to contain one or more batteries, comprising a primary base; a secondary base; a first sidewall; a second sidewall; a back wall; a first vertical extension; and a second vertical extension; wherein the primary base is disposed on top of and aligned with the secondary base, wherein the first sidewall and the back wall are coupled to the primary base, wherein the second sidewall is coupled to the secondary base, wherein the back wall is perpendicular to the first sidewall and the second sidewall, wherein the first vertical extension is coupled to the first sidewall, and wherein the second vertical extension is coupled to the second sidewall.

19 Claims, 5 Drawing Sheets

UNIVERSAL BATTERY TRAY

TECHNICAL FIELD

Embodiments of the present disclosure relate to battery cabinets and other power or electronic apparatuses comprising batteries, more particularly, to a mounting or enclosure tray configured to expand to accommodate different orientations of one or more batteries to achieve dimensional variability in horizontal and vertical directions.

BACKGROUND

An uninterruptible power supply (UPS) is an electrical apparatus that provides emergency power to a load when the input power source or mains power fails. The UPS operates for a relatively short amount of time to provide a buffer between when the input power source fails and when subsequent systems start to shut down. Typically, the UPS comprises of a power source such as a plurality of batteries. In some instances, space required for installation of the UPS, the plurality of batteries, and a given system communicatively coupled to the UPS is lacking.

In such instances, power management and communication are difficult and may be limiting. Further, different products (i.e., from various vendors) require different battery voltages which may require different orientation of the batteries within those products or different batteries altogether which may or may not have different dimensions. As such, each product requires different mounting trays which leads to higher costs. If one or more batteries need to be replaced with different dimensions, then there may need to be a redesign of the mounting trays to accommodate the new batteries. This can be applied to any applications that require a battery installed in a mounting tray, not just limited to an UPS.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Figure 1:
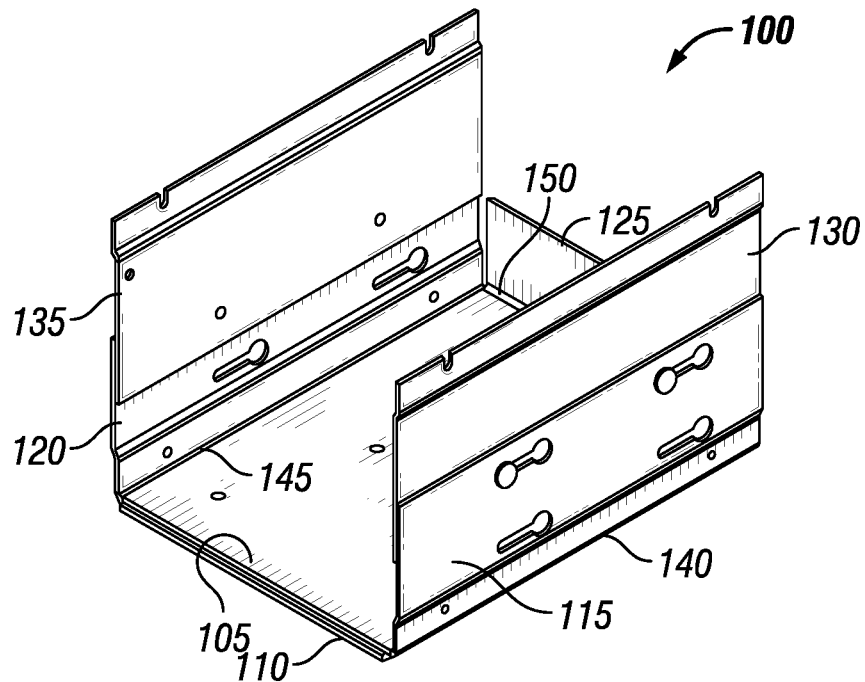
FIG. 1 illustrates a tray, in accordance with an embodiment of the present disclosure.

FIG. 1 illustrates an isometric view of a tray 100 configured to receive and/or contain one or more batteries that are coupled to an uninterruptible power supply (UPS). In embodiments, the tray may be utilized in any applications requiring batteries, not limited to an UPS. In embodiments, the tray 100 may be any suitable size, height, shape, and combinations thereof. The tray 100 may comprise of any suitable materials. Without limitations, the tray 100 may comprise of metals, nonmetals, polymers, composites, and combinations thereof. As illustrated, the tray 100 may comprise of a primary base 105, a secondary base 110, a first sidewall 115, a second sidewall 120, a back wall 125, a first vertical extension 130, and a second vertical extension 135. The primary base 105 may be disposed on top of and coupled to the secondary base 110. In embodiments, the primary base 105 and the secondary base 110 may comprise the same shape and size. The primary base 105 and the secondary base 110 may be disposed as to be aligned together while overlapping.

A bottom end 140 of the first sidewall 115 may be disposed along one side of the primary base 105 so as to be perpendicular to the primary base 105. In other embodiments, the first sidewall 115 and the primary base 105 may be a singular piece having undergone a metal forming process. A bottom end 145 of the second sidewall 120 may be disposed along one side of the secondary base 110 so as to be perpendicular to the secondary base 110. In embodiments, the first sidewall 115 may be disposed opposite to the second sidewall 120 as the primary base 105 and the secondary base 110 are aligned. A bottom end 150 of the back wall 125 may be disposed along another side of the primary base 105 so as to be perpendicular to the primary base 105. Further, the back wall 125 may be perpendicular to the first sidewall 115 and/or the second sidewall 120.

Figure 2:
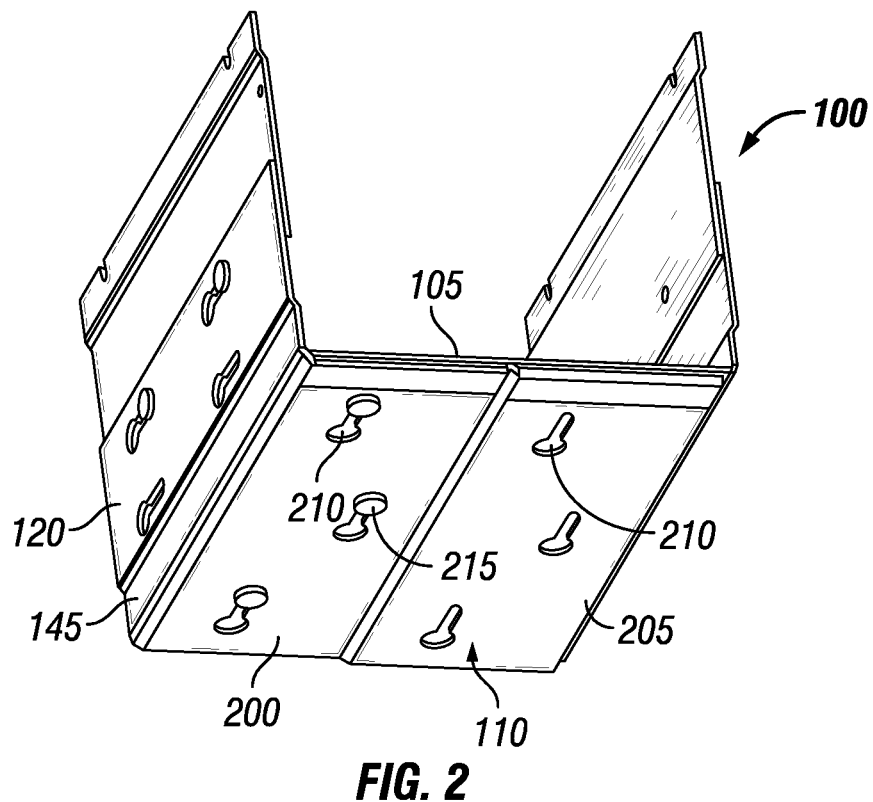
FIG. 2 illustrates a bottom view of a tray, in accordance with an embodiment of the present disclosure.

FIG. 2 illustrates an isometric, bottom view of the tray 100. As illustrated, the secondary base 110 comprises of a first panel 200 and a second panel 205. In embodiments, the first panel 200 and the second panel 205 may comprise the same shape and size. In other embodiments, the dimensions of the first panel 200 and the second panel 205 may be different. The first panel 200 may be coupled to and/or disposed adjacent to the second panel 205. As shown, the first panel 200 and the second panel 205 may be oriented in the same direction. The bottom end 145 of the second sidewall 120 may be coupled to the opposing side of the first panel 200 from the second panel 205. Without limitations, the bottom end 145 of the second sidewall 120 may be coupled to the first panel 200 using any suitable means, including welding, brazing, adhesives, metal forming, fasteners, and any combinations thereof. In other embodiments, the first panel 200 and the second sidewall 120 may be a singular piece having undergone a metal forming process. In embodiments, the first panel 200 and/or the second panel 205 may comprise of one or more holes 210 disposed completely through the thickness of the first panel 200 and/or the second panel 205. The one or more holes 210 may be any suitable size and shape. In embodiments, each of the one or more holes 210 may be uniformly shaped, uniformly disposed throughout the first panel 200 and/or the second panel 205, and combinations thereof. In alternate embodiments, the one or more holes 210 may be disposed randomly, in a defined pattern, and combinations thereof throughout the first panel 200 and/or the second panel 205. In other embodiments, each of the one or more holes 210 may have different shapes and/or sizes. As illustrated, the one or more holes 210 may be disposed at approximately the same location on the first panel 200 as the second panel 205. In embodiments, the one or more holes 210 may have a "thermometer" style shape to accommodate the disclosed slide and lock feature. Each of the one or more holes 210 may comprise a circular shape with a linear extension from the circular shape and a rounded end terminating the linear extension. The one or more holes 210 may be configured to receive one or more protrusions 215.

In embodiments, the one or more protrusions 215 may be coupled to the primary base 105. The one or more protrusions 215 may be disposed so as to extend underneath the primary base 105. In embodiments, the one or more protrusions 215 may be disposed at about the same location as the one or more holes 210 in the same plane, as the primary base 105 is disposed on top of and aligns with the secondary base 110. The one or more protrusions 215 may be any suitable size and shape. The one or more protrusions 215 may have a diameter that varies along the length of each protrusion 215. In embodiments, each of the one or more protrusions 215 may be uniformly shaped, uniformly disposed throughout the primary base 105, and combinations thereof. In alternate embodiments, the one or more protrusions 215 may be disposed randomly, in a defined pattern, and combinations thereof throughout the primary base 105. In other embodiments, each of the one or more protrusions 215 may have different shapes and/or sizes. In embodiments, each of the one or more protrusions 215 may comprise a cylindrical portion and a circular portion. The circular portion may be disposed at an end of the cylindrical portion and may be parallel to the primary base 105.

To couple the primary base 105 to the secondary base 110, the one or more protrusions 215 may be partially disposed through the portion of the one or more holes 210 comprising the circular shape. In embodiments, the diameter of the circular portion of the one or more protrusions 215 may not be greater than the circular shape of the one or more holes 210. In these embodiments, the circular portion of the one or more protrusions 215 may be disposed through respective circular shapes of the one or more holes 210. The primary base 105 and/or the secondary base 110 may be translated with respect to each other. As the primary base 105 and/or the secondary base 110 translates, each of the one or more protrusions 215 may translate along each of the linear extension portions of the one or more holes 210 until the cylindrical portion of the one or more protrusions 215 abuts the rounded end of each of the one or more holes 210. In this configuration, the primary base 105 may not be able to uncouple from the secondary base 110 as the diameter of the circular portions of the one or more protrusions 215 is greater than the linear extension portions of the one or more holes 210.

Figure 3:
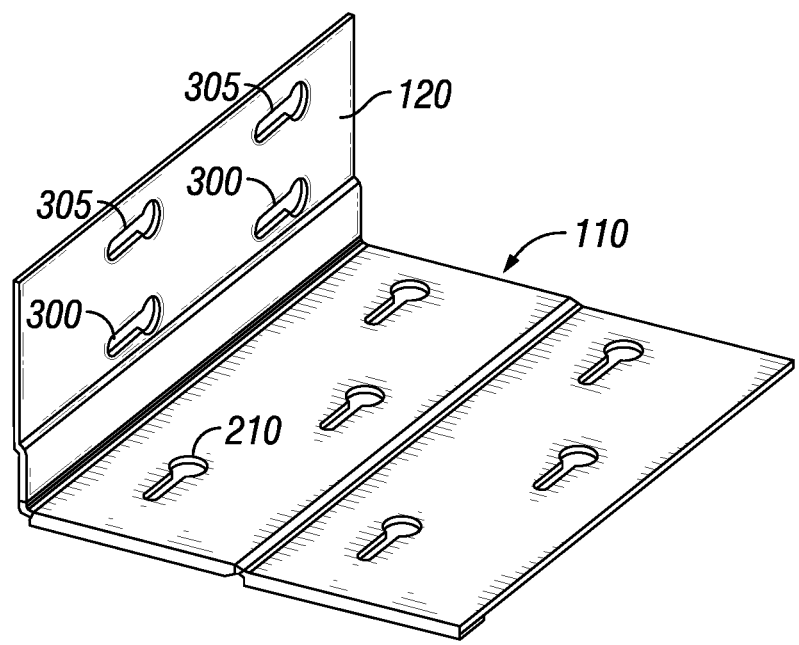
FIG. 3 illustrates a portion of a tray, in accordance with an embodiment of the present disclosure.

FIG. 3 illustrates an isometric view of parts of the tray 100 (referring to FIG. 1). FIG. 3 illustrates the secondary base 110 coupled to the second sidewall 120. As illustrated, the second sidewall 120 may comprise a first set 300 of one or more holes 210 and a second set 305 of one or more holes 210. In embodiments, the first set 300 of one or more holes 210 may be disposed below the second set 305 of one or more holes 210 with reference to the height of the second sidewall 120. The first set 300 of one or more holes 210 may be disposed at approximately the same horizontal location as the second set 305 of one or more holes 210 with reference to the length of the second sidewall 120. Similar to the one or more holes 210 disposed in the secondary base 110, the first set 300 and the second set 305 of one or more holes 210 may be configured to receive one or more protrusions 215 disposed on the second vertical extension 135 (referring to FIG. 1). One of ordinary skill may note that that the configuration of the first set 300 and the second set 305 of one or more holes 210 of the second sidewall 120 may be applied to the first sidewall 115 (referring to FIG. 1).

Figure 4:
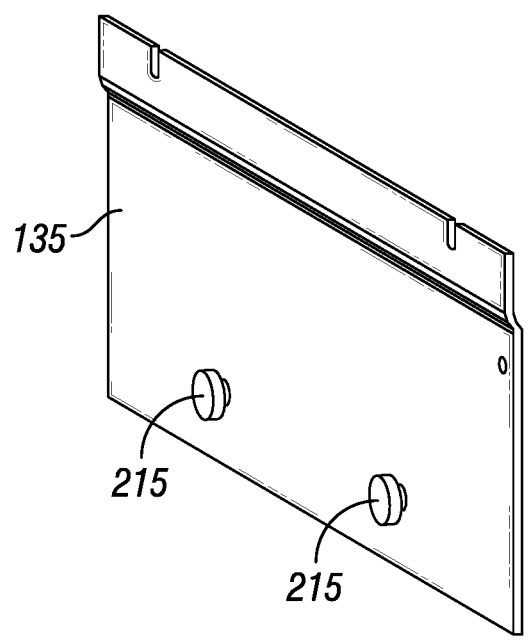
FIG. 4 illustrates a vertical extension, in accordance with an embodiment of the present disclosure.

FIG. 4 illustrates an isometric view of the second vertical extension 135. As illustrated, the second vertical extension 135 may comprise one or more protrusions 215. The one or more protrusions 215 may be disposed on the second vertical extension 135 so as to extend outward from the second vertical extension 135. In embodiments, the one or more protrusions 215 may be disposed at about the same horizontal location as the first set 300 or the second set 305 of one or more holes 210 with reference to the length of the second vertical extension 135, as the second vertical extension 135 may be coupled to the second sidewall 120 (referring to FIG. 1) and may have the same length as second sidewall 120. The one or more protrusions 215 may be any suitable size and shape. In embodiments, each of the one or more protrusions 215 may be uniformly shaped, uniformly disposed throughout the second vertical extension 135, and combinations thereof. In alternate embodiments, the one or more protrusions 215 may be disposed randomly, in a defined pattern, and combinations thereof throughout the second vertical extension 135. In other embodiments, each of the one or more protrusions 215 may have different shapes and/or sizes. The one or more protrusions 215 may have a diameter that varies along the length of each protrusion 215. In embodiments, each of the one or more protrusions 215 may comprise a cylindrical portion and a circular portion. The circular portion may be disposed at an end of the cylindrical portion and may be parallel to the second vertical extension 135. One of ordinary skill may note that the configuration of the second vertical extension 135 with regards to the one or more protrusions 215 may be applied to the first vertical extension 130 (referring to FIG. 1).

To couple the second vertical extension 135 to the second sidewall 120, the one or more protrusions 215 may be partially disposed through either the first set 300 or the second set 305 of one or more holes 210. Similar to coupling the primary base 105 (referring to FIG. 1) to the secondary base 110 (referring to FIG. 2), the one or more protrusions 215 may be partially disposed through the portion of the one or more holes 210 comprising the circular shape. In embodiments, the diameter of the circular portion of the one or more protrusions 215 may not be greater than the circular shape of the one or more holes 210. In these embodiments, the circular portion of the one or more protrusions 215 may be disposed through respective circular shapes of the one or more holes 210. The second vertical extension 135 and/or the second sidewall 120 may be translated with respect to each other. As the second vertical extension 135 and/or the second sidewall 120 translates, each of the one or more protrusions 215 may translate along each of the linear extension portions of the one or more holes 210 until the cylindrical portion of the one or more protrusions 215 abuts the rounded end of each of the one or more holes 210. In this configuration, the second vertical extension 135 may not be able to uncouple from the second sidewall 120 as the diameter of the circular portions of the one or more protrusions 215 is greater than the linear extension portions of the one or more holes 210. One of ordinary skill may note that the assembly of the second vertical extension 135 to the second sidewall 120 may be applied to the first vertical extension 130 and the first sidewall 115 (referring to FIG. 1).

Figure 5A:
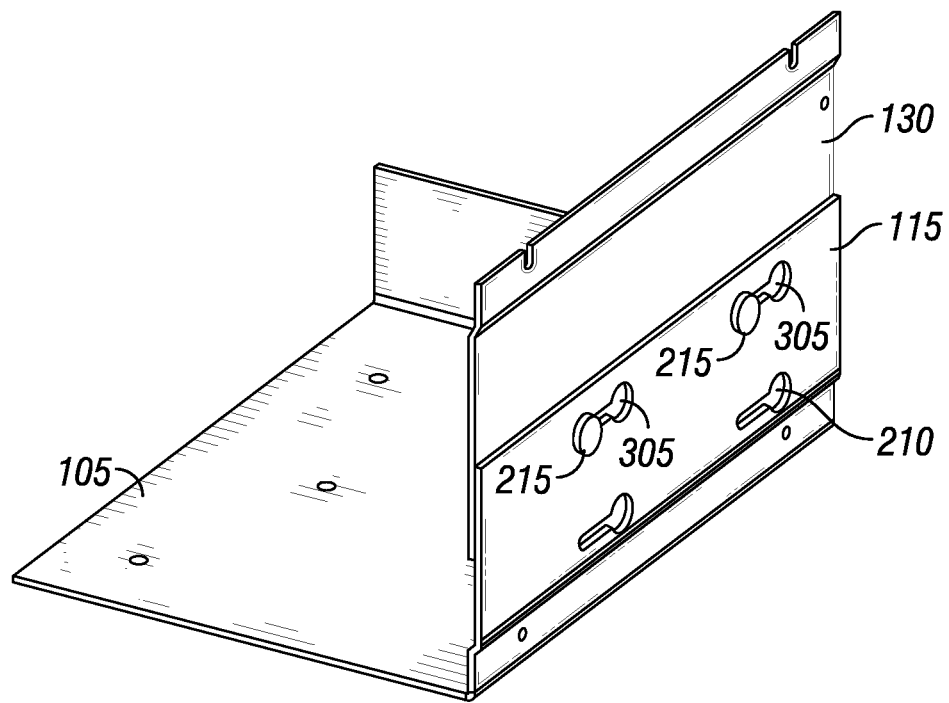
FIG. 5A illustrates a portion of a tray assembled, in accordance with an embodiment of the present disclosure.
Figure 5B:
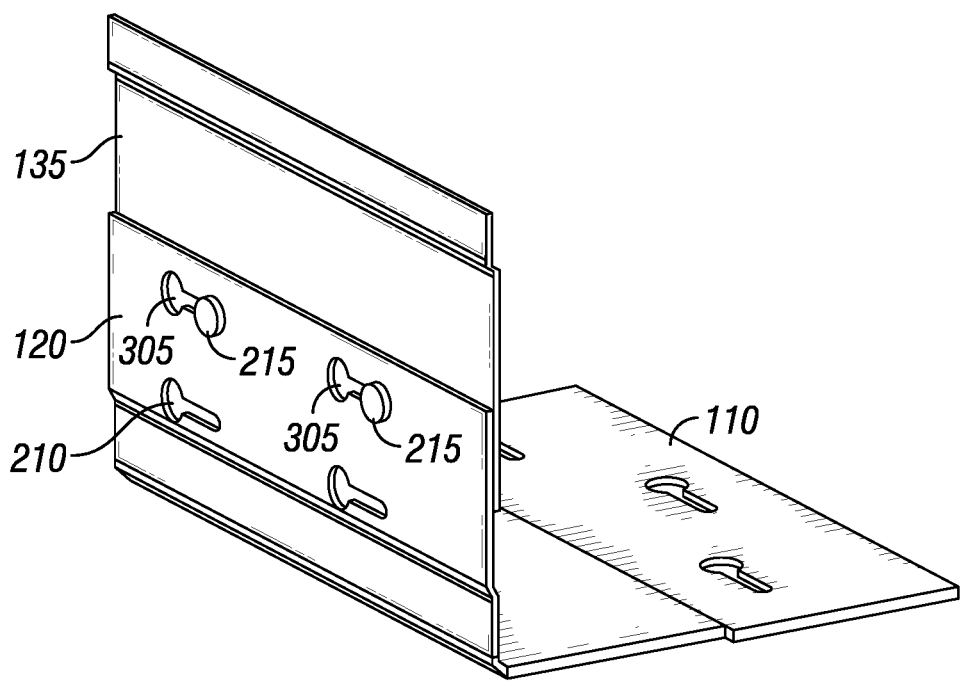
FIG. 5B illustrates a portion of a tray assembled, in accordance with an embodiment of the present disclosure.

FIGS. 5A-5B illustrate isometric views of portions of the tray 100 (referring to FIG. 1) mid-assembly. FIG. 5A illustrates the first vertical extension 130 coupled to the first sidewall 115. As illustrated, the one or more protrusions 215 of the first vertical extension 130 may be disposed at least partially through the second set 305 of one or more holes 210. FIG. 5B illustrates the second vertical extension 135 coupled to the second sidewall 120. As illustrated, the one or more protrusions 215 of the second vertical extension 135 may be disposed at least partially through the second set 305 of one or more holes 210. Referring to both FIGS. 5A and 5B, as the one or more protrusions 215 are disposed at least partially through the second set 305 of one or more holes 210, the first vertical extension 130 and the second vertical extension 135 may be in a second position. In embodiments, the second position may provide the tray 100 with a larger height than a first position. With regards to the present disclosure, the first position may be when the one or more protrusions 215 are disposed at least partially through the first set 300 (referring to FIG. 3) of one or more holes 210. In comparison to the second position, the height of the first vertical extension 130 and the second vertical extension 135 in relation to the primary base 105 and/or the secondary base 110 may be less than the height of first vertical extension 130 and the second vertical extension 135 in the second position.

Figure 6:
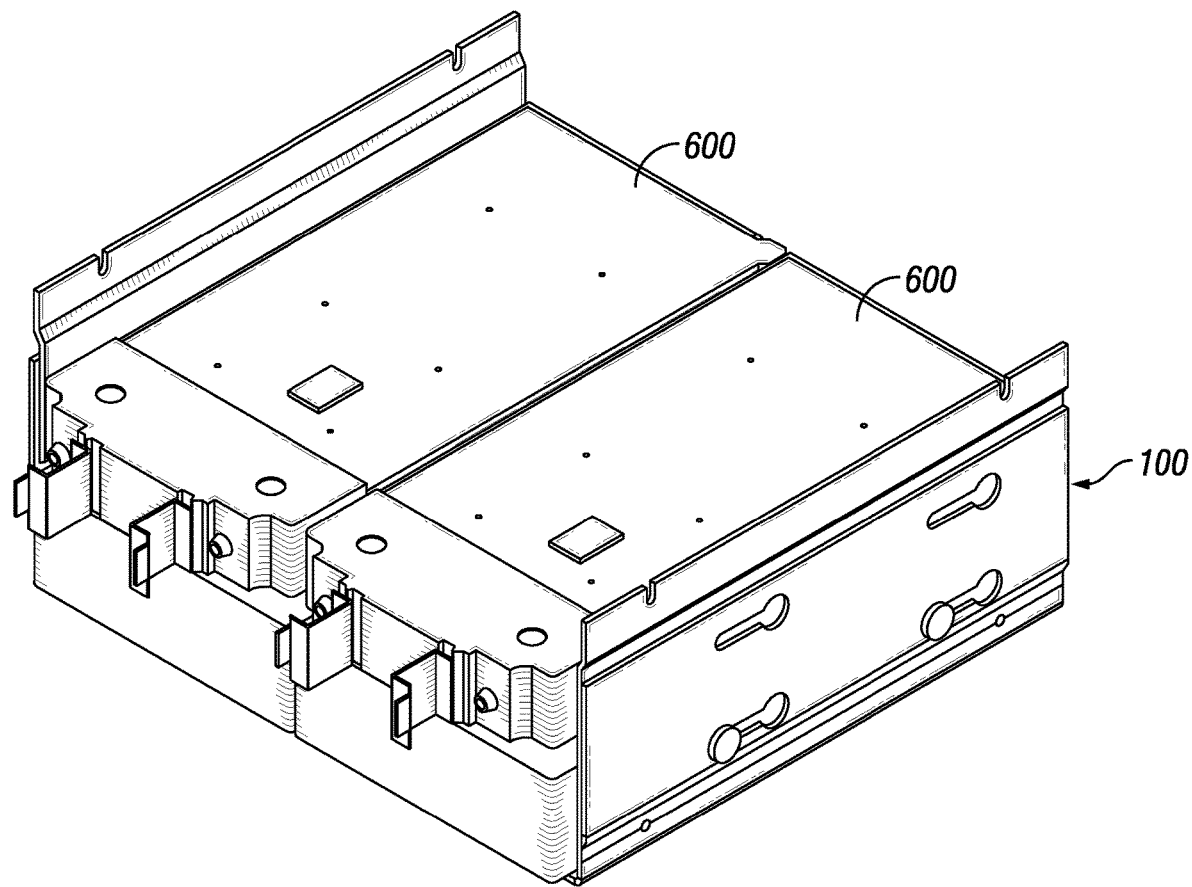
FIG. 6 illustrates a tray containing one or more batteries, in accordance with an embodiment of the present disclosure.
Figure 7:
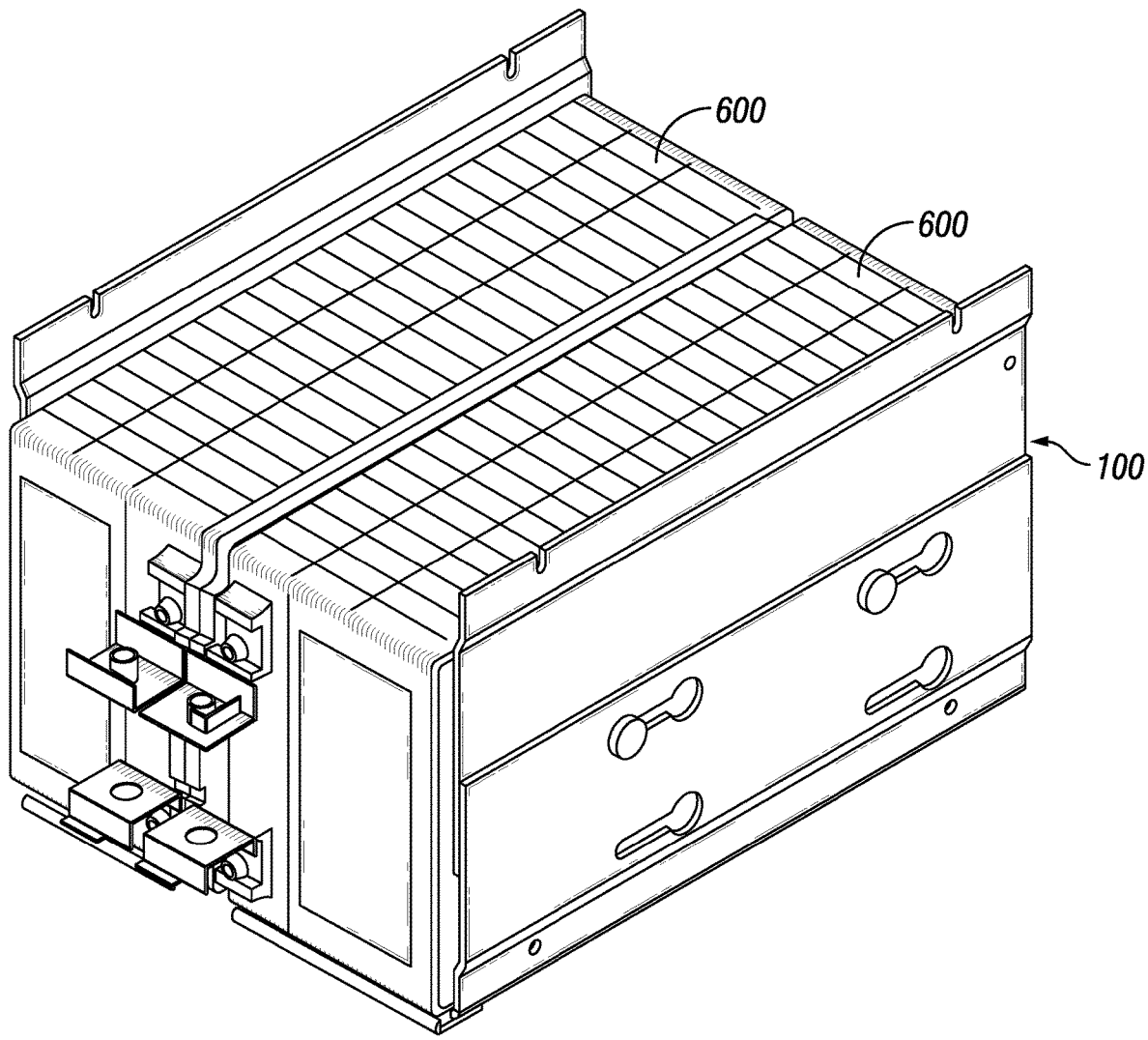
FIG. 7 illustrates a tray containing one or more batteries, in accordance with an embodiment of the present disclosure.

FIGS. 6 and 7 illustrate embodiments of the tray 100 containing at least one battery 600. There may be one or more batteries 600 disposed within the tray 100. Without limitations, the one or more batteries 600 may be lithium-ion batteries, valve-regulated lead-acid (VRLA) batteries, or any other suitable batteries. FIG. 6 illustrates the tray 100 in an expanded horizontal position, and FIG. 7 illustrates the tray 100 in an expanded vertical position. In embodiments, the primary base 105 (referring to FIG. 1) may be in either a first position or a second position in relation to the secondary base 110 (referring to FIG. 1). When the one or more protrusions 215 (referring to FIG. 2) of the primary base 105 are disposed at least partially through the one or more holes 210 (referring to FIG. 2) of the first panel 200 (referring to FIG. 2) of the secondary base 110, the primary base 105 may be in a first position with reference to the secondary base 110. When the one or more protrusions 215 of the primary base 105 are disposed at least partially through the one or more holes 210 of the second panel 205 (referring to FIG. 2) of the secondary base 110, the primary base 105 may be in a second position with reference to the secondary base 110. As illustrated in FIG. 6, the tray 100 may be in the second position with respect to the primary base 105 and the secondary base 110 and may be in a first position with respect to the first vertical extension 130 and the second vertical extension 135. In embodiments, this may be referred to herein as the "expanded horizontal position." As illustrated in FIG. 7, the tray 100 may be in the first position with respect to the primary base 105 and the secondary base 110 and may be in the second position with respect to the first vertical extension 130 and the second vertical extension 135. In embodiments, this may be referred to herein as the "expanded vertical position." In embodiments, the tray 100 may be in the expanded horizontal position, the expanded vertical position, and combinations thereof depending on the orientation of the one or more batteries 600 contained within the tray 100. While the present disclosure illustrates the expanded horizontal position and the expanded vertical position, the tray 100 may have two additional configurations. In embodiments, one of the other two configurations of the tray 100 may be the primary base 105 in the first position in relation to the secondary and the first vertical extension 130 and the second vertical extension 135 being in the first position as well. In embodiments, the remaining one of the other two configurations of the tray 100 may be the tray 100 in both the expanded horizontal position and the expanded vertical position. While the present disclosure relates to utilizing one or more protrusions 215 and one or more holes 210 for a slide and lock feature, other suitable mechanisms, such as a tongue and lance feature, may be used to adjust the tray 100.

Although the disclosure and its advantages have been described in detail, it should be understood that various changes, substitutions and alterations can be made herein without departing from the spirit and scope of the disclosure as defined by the following claims.

What is claimed is:

1. A tray configured to contain one or more batteries, comprising:
    a primary base comprising one or more protrusions;
    a secondary base, wherein the primary base is disposed on top of and aligned with the secondary base, wherein the primary base is flush against the secondary base, wherein the one or more protrusions of the primary base are operable to extend from the primary base and engage with one or more holes of the secondary base;
    a first sidewall coupled to the primary base;
    a second sidewall coupled to the secondary base;
    a back wall coupled to the primary base, wherein the back wall is perpendicular to the first sidewall and the second sidewall;
    a first vertical extension coupled to the first sidewall; and
    a second vertical extension coupled to the second sidewall.

2. The tray of claim 1, wherein a bottom end of the first sidewall is coupled to the primary base and a bottom end of the back wall is coupled to the primary base, wherein the first sidewall and the back wall are perpendicular to the primary base.

3. The tray of claim 1, wherein each of the one or more protrusions comprises a cylindrical portion and a circular portion, wherein the circular portion is disposed at an end of the cylindrical portion, and wherein each of the one or more holes comprise the shape of a circular shape with a linear extension from the circular shape and a rounded end terminating the linear extension or a thermometer style shape.

4. The tray of claim 3, wherein the secondary base comprises a first panel and a second panel, wherein the second panel is coupled to one end of the first panel, wherein a bottom end of the second sidewall is coupled to an opposite end of the first panel.

5. The tray of claim 4, wherein the one or more holes are disposed on each of the first panel and the second panel, wherein the one or more holes are disposed at the same location on the first panel as on the second panel.

6. The tray of claim 5, wherein the one or more protrusions are at least partially disposed through the one or more holes disposed on the first panel.

7. The tray of claim 5, wherein the one or more protrusions are at least partially disposed through the one or more holes disposed on the second panel.

8. The tray of claim 3, wherein the first vertical extension comprises one or more protrusions.

9. The tray of claim 8, wherein the first sidewall comprises a first set of one or more holes and a second set of one or more holes.

10. The tray of claim 9, wherein the first set of one or more holes is disposed below the second set of one or more holes with reference to the height of the first sidewall.

11. The tray of claim 10, wherein the first set of one or more holes is disposed at the same horizontal location as the second set of one or more holes with reference to the length of the first sidewall.

12. The tray of claim 11, wherein the one or more protrusions are at least partially disposed through the first set of one or more holes disposed on the first sidewall.

13. The tray of claim 11, wherein the one or more protrusions are at least partially disposed through the second set of one or more holes disposed on the first sidewall.

14. The tray of claim 3, wherein the second vertical extension comprises one or more protrusions.

15. The tray of claim 14, wherein the second sidewall comprises a first set of one or more holes and a second set of one or more holes.

16. The tray of claim 15, wherein the first set of one or more holes is disposed below the second set of one or more holes with reference to the height of the second sidewall.

17. The tray of claim 16, wherein the first set of one or more holes is disposed at the same horizontal location as the second set of one or more holes with reference to the length of the second sidewall.

18. The tray of claim 17, wherein the one or more protrusions are at least partially disposed through the first set of one or more holes disposed on the second sidewall.

19. The tray of claim 17, wherein the one or more protrusions are at least partially disposed through the second set of one or more holes disposed on the second sidewall.

* * * * *